United States Patent [19]

Noda et al.

[11] Patent Number: 5,408,451
[45] Date of Patent: Apr. 18, 1995

[54] DRIVING DEVICE FOR OBJECTIVE LENS

[75] Inventors: Kazuo Noda, Yokohama; Eiichi Nakamura, Sagamihara, both of Japan

[73] Assignee: Nippon Conlux Co., Ltd., Tokyo, Japan

[21] Appl. No.: 38,451

[22] Filed: Mar. 29, 1993

[30] Foreign Application Priority Data

Apr. 2, 1992 [JP] Japan .................. 4-081005

[51] Int. Cl.⁶ ............................. G11B 7/00
[52] U.S. Cl. ................. 369/44.15; 369/244; 359/824
[58] Field of Search ............ 369/44.15, 44.16, 44.17, 369/43, 44.18, 244, 44.19, 44.21, 44.22, 44.14; 359/824, 823; 280/201.02, 201.05

[56] References Cited

U.S. PATENT DOCUMENTS

| | | | |
|---|---|---|---|
| 4,547,871 | 10/1985 | Sugiyama et al. | 369/44.14 |
| 4,568,142 | 2/1986 | Iguma | 369/44.16 |
| 4,633,456 | 12/1986 | Luecke | 369/44.16 |
| 4,767,187 | 8/1988 | Gijzen et al. | 369/44.15 |
| 4,813,033 | 3/1989 | Baasch et al. | 369/44.16 |
| 5,018,836 | 5/1991 | Noda et al. | 369/44.16 |
| 5,140,471 | 8/1992 | Kasahara | 369/44.14 |
| 5,144,607 | 9/1992 | Ishida et al. | 369/44.22 |
| 5,243,524 | 9/1993 | Kang | 369/44.21 |
| 5,264,968 | 11/1993 | Masunaga | 369/44.16 |

FOREIGN PATENT DOCUMENTS

| | | | |
|---|---|---|---|
| 59-144053 | 8/1984 | Japan . | |
| 59-191147 | 10/1984 | Japan . | |
| 60-098531 | 6/1985 | Japan . | |
| 62-137732 | 6/1987 | Japan | 369/44.15 |
| 62-287440 | 12/1987 | Japan | 369/44.15 |
| 1236434 | 9/1989 | Japan | 369/44.16 |
| 3157823 | 7/1991 | Japan | 369/44.14 |
| 3209636 | 9/1991 | Japan | 369/44.15 |

*Primary Examiner*—Aristotelis Psitos
*Assistant Examiner*—Nabil Hindi
*Attorney, Agent, or Firm*—Spensley Horn Jubas & Lubitz

[57] ABSTRACT

To provide a driving device for an objective lens that has a high driving sensitivity and superior driving frequency characteristics.

The present invention relates to a device for driving the objective lens (1) of an optical head that uses a device for recording information on an optical information recording medium, and for reproducing information therefrom, by irradiating a beam of light thereon while positioning and focusing the light with respect to an information track on the optical information recording medium. The device has a loose linkage member which supports an objective lens within a cylindrical member and comprises the cylindrical member (14) and a cylindrical hole portion (19) into which the cylindrical member is inserted so as to face the cylindrical hole with an air gap therebetween and with the axes thereof oriented vertically, and the driving force generated by a tracking coil (3) is transmitted through this loose linkage member to the objective lens.

6 Claims, 6 Drawing Sheets

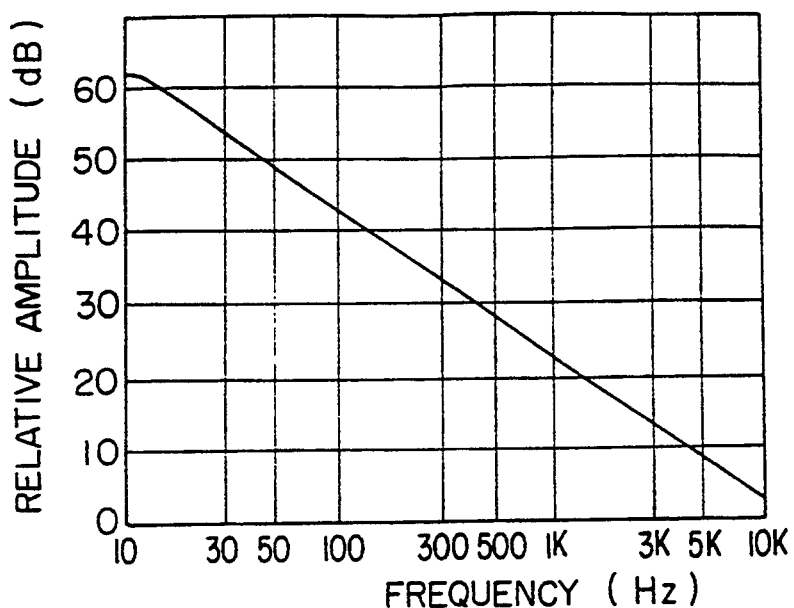
F I G. 6
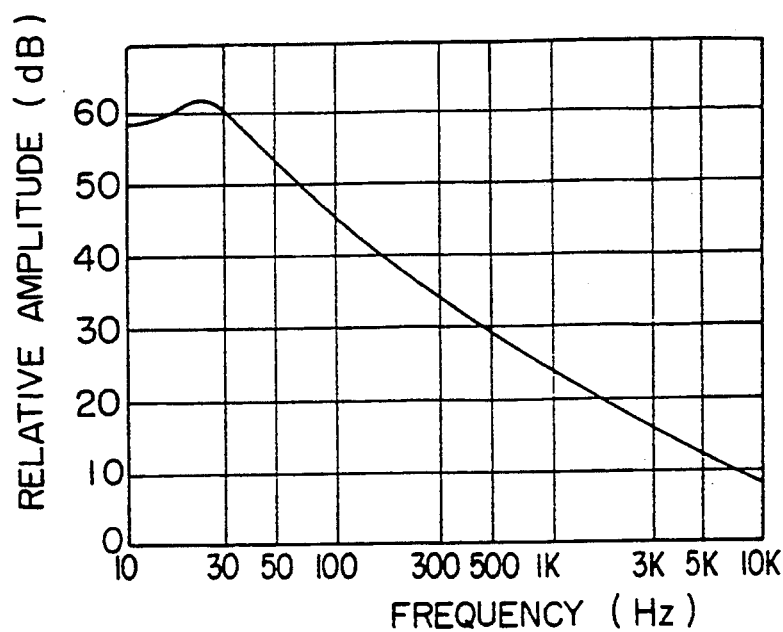
F I G. 7

DRIVING DEVICE FOR OBJECTIVE LENS

BACKGROUND OF THE INVENTION

The present invention relates to an information recording and reproduction apparatus for recording information on an optical information recording medium and reproducing the information therefrom, and, in particular, to a device for driving the objective lens of an optical head that irradiates a beam of light with respect to an optical information recording medium, in order to record or reproduce information.

Prior Art

In order to irradiate a beam of light onto the information recording medium in an optical information recording and reproduction apparatus, a focusing action for concentrating the beam of light onto an information track of the medium and a tracking action for following the track are performed by driving the objective lens of an optical head in two dimensions.

Two examples of methods used for this two-dimensional driving device are the axial-sliding method shown in FIG. 8 and the elastic-body support method shown in FIG. 9.

Of these methods, the driving device shown in FIG. 8 has a configuration such that an objective lens 1 is mounted in an end portion thereof and a drum-shaped driving unit 4 comprising a focusing coil 2 and a tracking coil 3 wound around each other is placed over a fixed central shaft 5. The driving unit 4 is configured such that it performs both a focusing action by sliding the objective lens 1 axially (in the direction of an optical axis 10) by the magnetic action of magnetic circuits 9a and 9b formed of magnets 6a and 6b, outer yokes 7a and 7b, and inner yokes 8a and 8b; and a tracking action by rotating in a circumferential direction 11 about the center of the fixed central shaft 5.

The driving device shown in FIG. 9 uses one type of the elastic-body support method in which an objective lens 1 is mounted thereon, a driving unit 4 comprising a focusing coil 2 and a tracking coil 3 wound around each other is supported by four elastic support bodies 12, and the driving unit 4 fits over and is positioned by magnetic circuits 9a and 9b formed of magnets 6a and 6b, outer yokes 7a and 7b, and inner yokes 8a and 8b. A focusing operation along the optical axis 10 of the objective lens and a tracking operation in a direction perpendicular thereto are performed by the magnetic action of the magnetic circuits 9a and 9b.

The driving unit of the two-dimensional driving device of the objective lens must be able to follow various motions such as the fast rotation of the information recording medium and reciprocating motion, so it must have a high driving sensitivity and good driving frequency characteristics.

Therefore, the driving unit must be light and compact, and it must be designed in such a way that secondary resonance is not likely to occur while the drive is operating. If secondary resonance were to occur, it would not be possible to support servo drive up into the high-frequency region, and it would not be possible to record and reproduce information accurately. Therefore, it would be ideal to have the driving unit consisting only of the objective lens.

However, with the axial-sliding method shown in FIG. 8, the large, heavy drum-shaped driving unit 4 must be driven, and this method has the problem in that it is difficult to increase its driving sensitivity. With the elastic-body support method shown in FIG. 9, the use of elastic bodies means that secondary resonance can easily occur, but if damping members are used to suppress this secondary resonance the problem arises that the driving frequency characteristics vary with temperature.

SUMMARY OF THE INVENTION

The present invention has been developed to solve the above problems and has as its object the provision of a driving device for an objective lens that has a high driving sensitivity and superior driving frequency characteristics.

Problem to be Solved by the Present Invention

To achieve the above purpose, the present invention provides: a driving device for an objective lens, wherein an optical head with a built-in light source and objective lens is positioned with respect to an information track on an optical information recording medium, and information is recorded thereon and reproduced therefrom by focusing and irradiating a beam of light thereon. The driving device for an objective lens is characterized in comprising: a loose linkage means which comprises a cylindrical member and a cylindrical hole portion into which the cylindrical member is inserted so as to face the cylindrical hole with an air gap therebetween and with the axes thereof oriented vertically; a lens support member which has the cylindrical member in the center thereof and supports the objective lens within the cylindrical member; an arm member which is constructed of a low-elasticity material and which supports the cylindrical member at an end portion thereof so as to be able to vibrate; a tracking coil which is mounted on the arm member and which vibrates the arm member in a direction perpendicular to the axial direction of the cylindrical member and the cylindrical hole portion in order to make the objective lens follow the information track; a magnet which generates a magnetic field in the tracking coil; a focusing coil which is mounted on the lens support member and which moves the cylindrical member in the axial direction thereof in order to bring the objective lens to a focus; and a magnet which generates a magnetic field in the focusing coil.

Action of the Present Invention

The objective lens is positioned within the cylindrical member provided in the center of the lens support member. The cylindrical member faces the cylindrical hole portion with a layer of air in the air gap therebetween. The cylindrical member and the cylindrical hole portion positioned facing each other with a layer of air therebetween are supported so as to be able to vibrate on an end portion of the arm member. In this manner, the objective lens and the arm member are linked together by the cylindrical member and the cylindrical hole portion, which face each other with the layer of air therebetween.

The lens support member is driven in accordance with the driving force of the focusing coil, to drive the objective lens in the optical axis direction. The arm member applies the driving force of the tracking coil to the cylindrical hole portion, that driving force is then transmitted from the cylindrical hole portion to the cylindrical member through the medium of the layer of air therebetween, and thus the objective lens mounted within the cylindrical member is driven in a direction perpendicular to the optical axis direction.

EFFECT OF THE PRESENT INVENTION

Since the present invention as described above provides a lens support member and arm member that are linked together as a pair of circular cylinders facing each other with a layer of air therebetween, with the objective lens supported by the lens support member so that the objective lens does not need the characteristic support mechanism of the conventional device, it can provide a driving device for an objective lens that has a light, compact surround for the objective lens, and also has a high driving sensitivity. The arm member that enables the tracking action has a low elasticity, so that secondary resonance is not likely to occur and thus is provided a driving device for an objective lens with superior driving frequency characteristics.

BRIEF DESCRIPTION OF THE DRAWINGS

FIG. 6 is a graph of measured focusing frequency characteristic of the device according to the present invention;

FIG. 7 is a graph of measured tracking frequency characteristic of the device according to the present invention;

PREFERRED EMBODIMENTS OF THE PRESENT INVENTION

Figure 1:
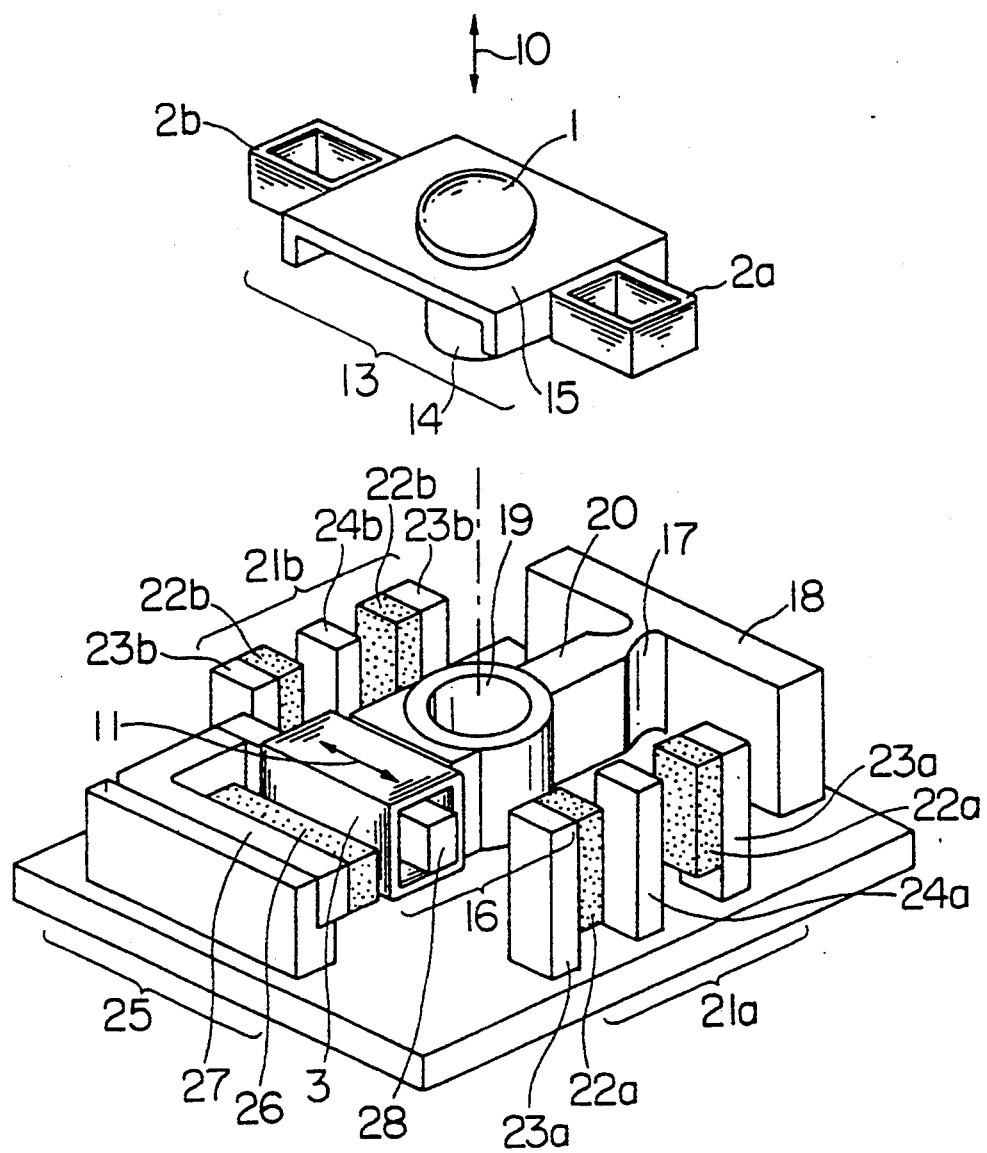
FIG. 1 is an exploded perspective view of an embodiment of the present invention.

FIG. 1 is an exploded perspective view of the structure of an embodiment of the present invention for performing focusing and tracking driving of an objective lens. In order to clearly illustrate the mechanical component that characterizes the present invention—the linkage between the objective lens and the support mechanism, formed by the cylindrical member and the cylindrical hole member facing each other with a layer of air therebetween—the figure shows a state wherein a focusing driving unit 13 having an objective lens 1 is pulled away above the other components.

The focusing driving unit 13 of the present invention is configured of a lens support member 15 provided at the center thereof with a cylindrical member 14 holding the objective lens 1 therein, with focusing coils 2a and 2b on either side thereof.

The focusing driving unit 13 is combined with a tracking driving unit 16. In other words, the cylindrical member 14 of the focusing driving unit 13 is inserted into a cylindrical hole portion 19 provided in a part near the end of an arm member 20 that is linked to a fixed member 18 by a hinge 17 formed as a constriction portion, thus linking the two driving units 13 and 16. The hinge 17 could be replaced by another type of member such as a spring, shaft, or pivot. The end of the arm member 20 made of resin is provided with a tracking coil 3.

Focusing magnetic circuits 21a and 21b that create a magnetic action within the focusing driving unit 13 are closed magnetic paths configured by magnets 22a and 22b, outer yokes 23a and 23b, and inner yokes 24a and 24b. The inner yokes 24a and 24b are positioned so as to be inserted within the focusing coils 2a and 2b.

A tracking magnetic circuit 25 that forms a magnetic action within the tracking driving unit 16 is a closed magnetic path configured by a magnet 26, an outer yoke 27, and an inner yoke 28. The inner yoke 28 is positioned so as to be inserted within the inner yoke 28.

Figure 2:
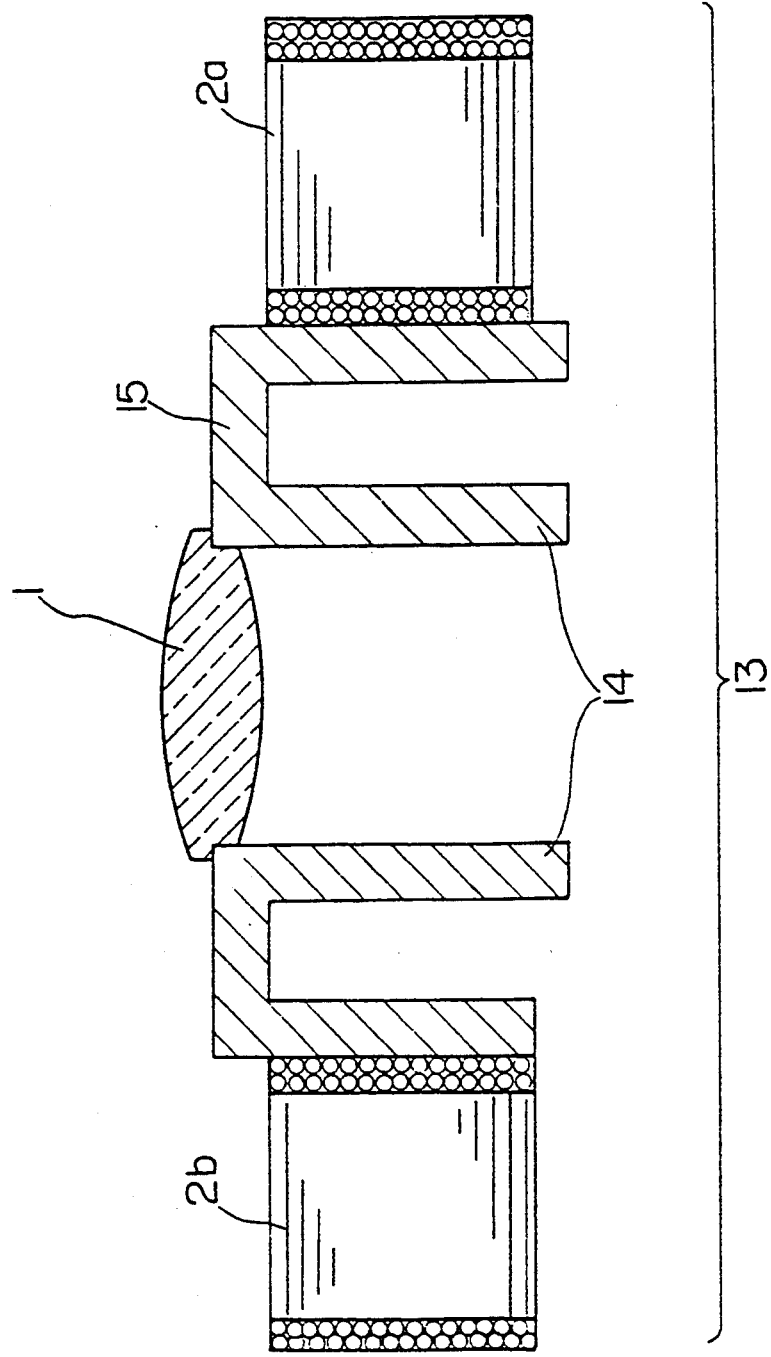
FIG. 2 is a cross-sectional view through the focusing driving unit of the embodiment of FIG. 1.

FIG. 2 is a cross-sectional view through the focusing driving unit 13 of FIG. 1. The focusing driving unit indicated by reference number 13 is configured of the objective lens 1, the focusing coils 2a and 2b, the cylindrical member 14 whose outer surface is combined with the objective lens 1 to form an action surface, and the lens support member 15 that links together the focusing coils 2a and 2b and the objective lens 1.

This embodiment of the present invention, configured by combining the focusing magnetic circuits 21a and 21b and the tracking magnetic circuit 25 with the tracking driving unit 16, drives the focusing driving unit 13 constructed in the above manner to move the objective lens 1 in either a focusing direction 10 or a tracking direction 11 shown in FIG. 1, by supplying power to the focusing coils 2a and 2b or the tracking coil 3, as appropriate.

During focusing driving, the driving force of the focusing coils 2a and 2b is transmitted directly to the objective lens 1 through the lens support member 15. Conversely, during tracking driving, the driving force of the tracking coil 3 is transmitted to the objective lens 1 by a layer of air of a thickness of about 10 $\mu$m between an action surface that is the outer surface of the cylindrical member 14 and an action surface that is the inner surface of the cylindrical hole portion 19 functions as a active force transmission means. In other words, the tracking driving force is transmitted through a fluid but, since the optical head is reacting at high speeds during normal operation, this driving force is transmitted accurately to the objective lens.

In this case, the outer surface of the cylindrical member 14 and the inner surface of the cylindrical hole portion 19 do not come into direct contact in normal operation, but they will slide over one another during low-speed operation so they should be formed by a reduced-friction or friction-resistant processing such as fluorocarbon resin processing with this eventuality in mind.

Figure 3:
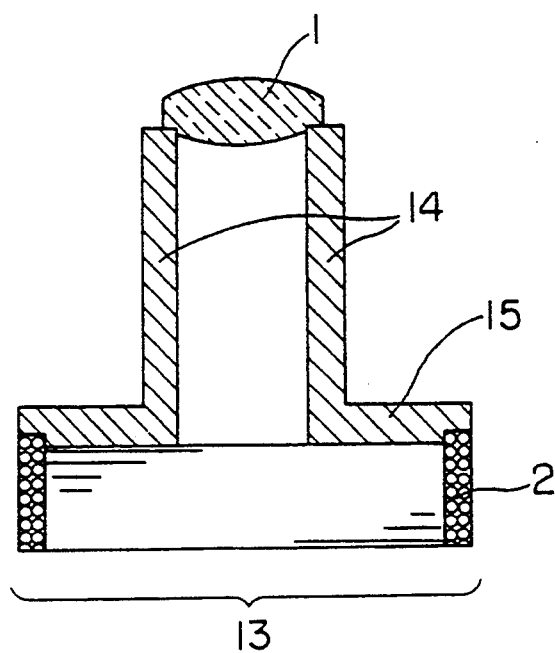
FIG. 3 is a view of the structure of the focusing driving unit of a second embodiment of the present invention.

FIG. 3 shows the configuration of the focusing driving unit of a second embodiment of the present invention, in which there is only one focusing coil instead of the two focusing coils of FIG. 1. In this embodiment, a single focusing coil 2 is provided at the lower end of the cylindrical member 14, and it is linked to the cylindrical member 14 by the lens support member 15. This focusing driving unit has a simpler configuration than that of FIG. 1.

Figure 4:
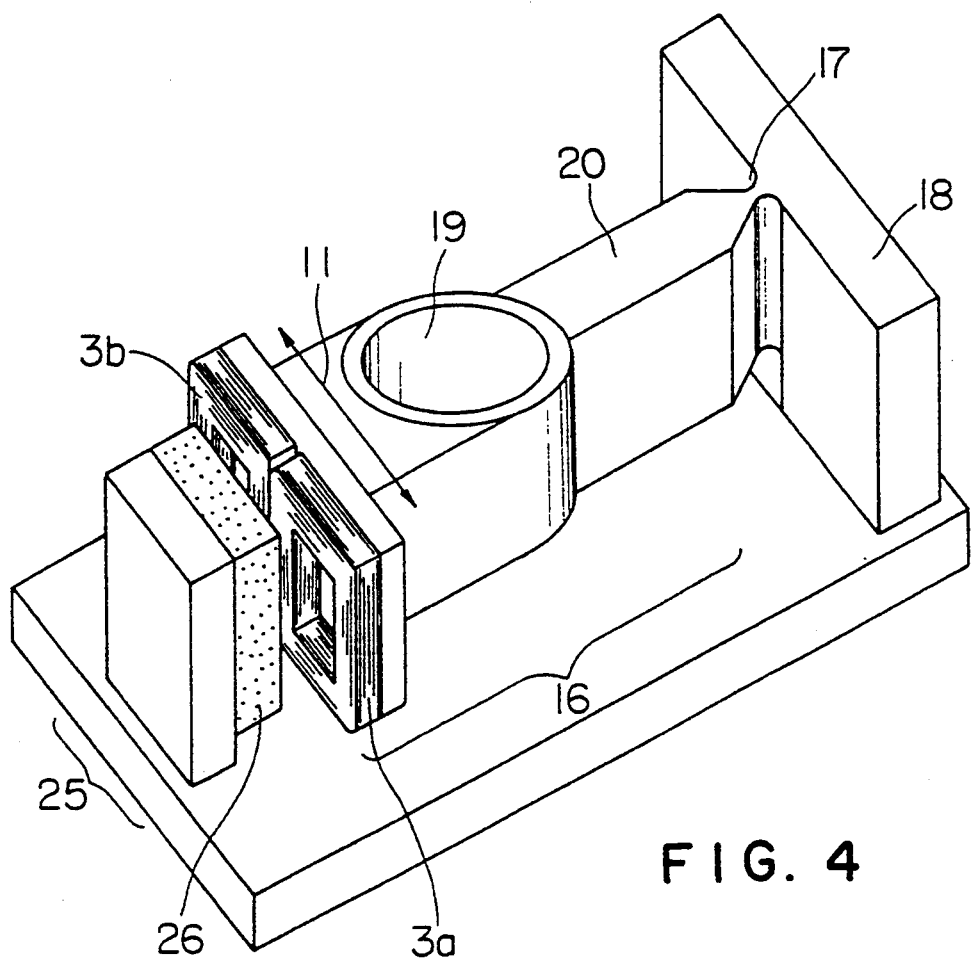
FIG. 4 is a view of the structure of the tracking driving unit of a third embodiment of the present invention;.

FIG. 4 shows the configuration of the tracking driving unit of a third embodiment of the present invention. In this embodiment, the tracking magnetic circuit 25 is configured of an open magnetic circuit having a magnet 26, and the tracking driving unit 16 furnished with tracking coils 3a and 3b is driven in the directions of the arrows 11 by the magnetic action of the tracking magnetic circuit 25. This tracking driving unit has a simpler configuration than that of FIG. 1.

Figure 5:
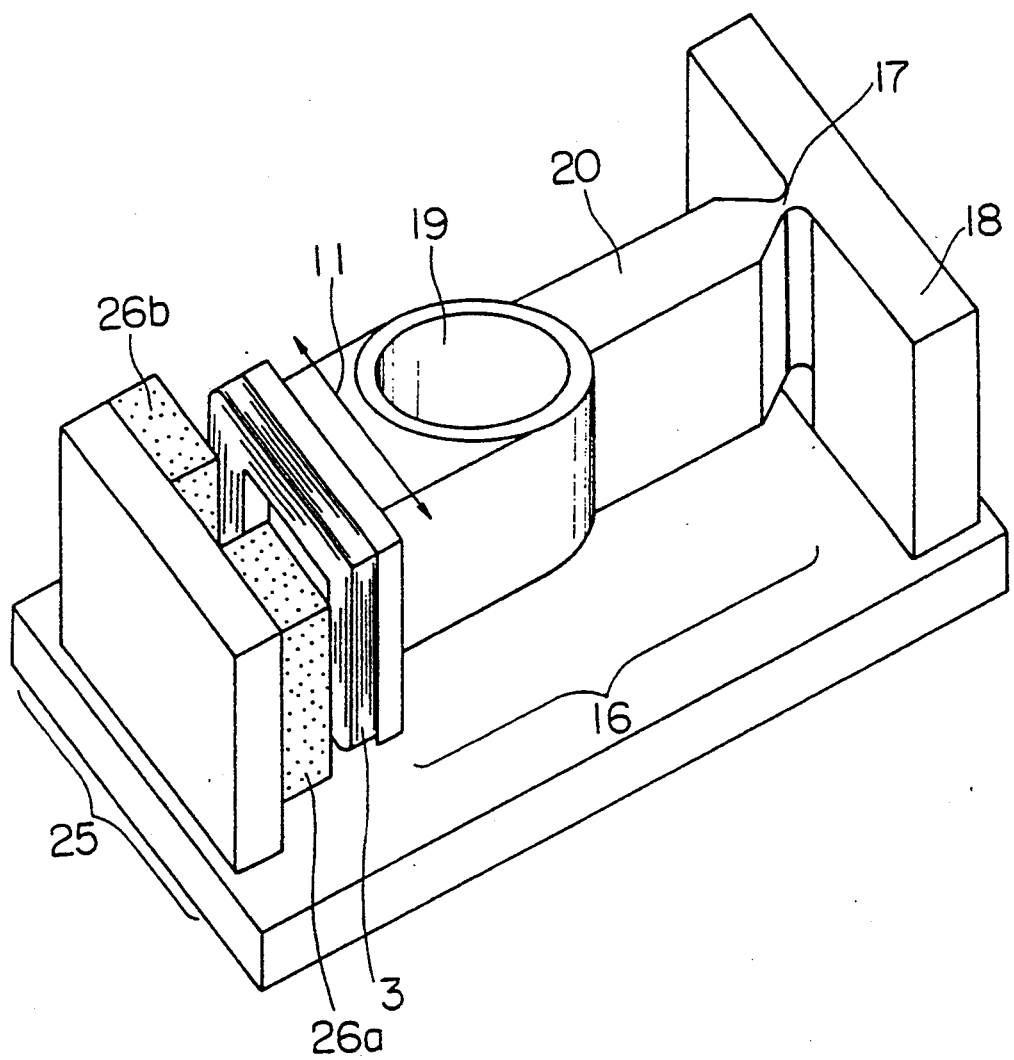
FIG. 5 is a view of the tracking driving unit of a fourth embodiment of the present invention.
Figure 8:
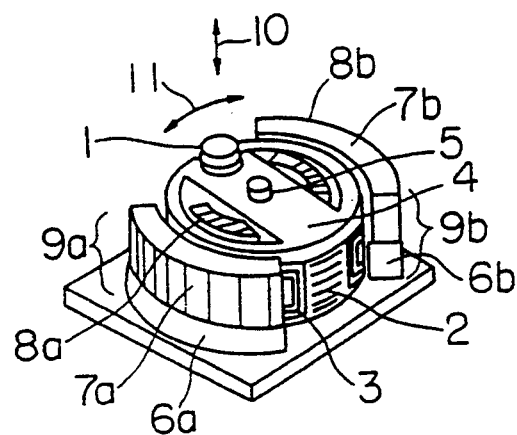
FIG. 8 is a view illustrating a conventional objective lens driving method that is called the axial-sliding method.
Figure 9:
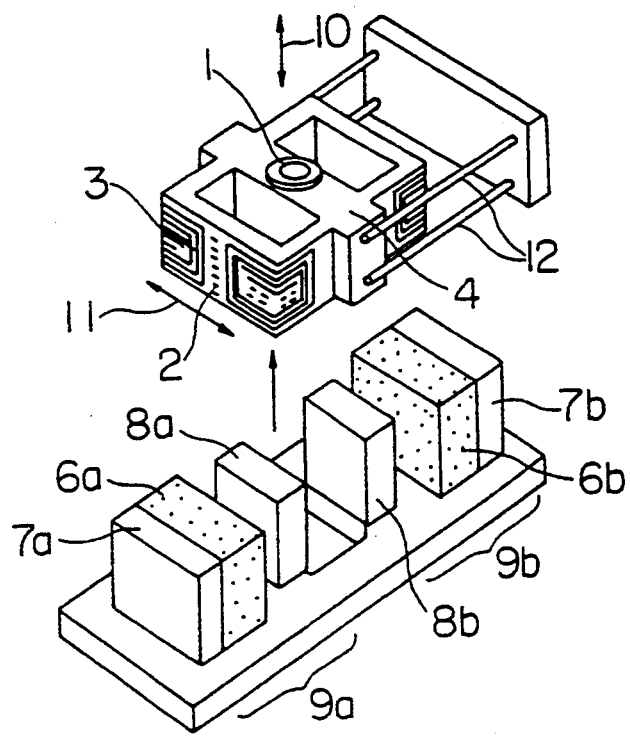
FIG. 9 is a view illustrating a conventional objective lens driving method that is called the elastic-body support method.

FIG. 5 shows the configuration of the tracking driving unit of a fourth embodiment of the present invention in which there is one tracking coil 3 and two magnets 26a and 26b. This configuration is also simpler than that of FIG. 1.

FIG. 6 is a graph of the measured focusing frequency characteristic of the device of the present invention, showing the response amplitude of the objective lens between 10 Hz and 10 kHz. It can be seen from this graph that the amplitude decreases exponentially as the driving frequency increases.

FIG. 7 is a graph of the measured tracking frequency characteristic of the device of the present invention, showing the response amplitude of the objective lens between 10 Hz and 10 kHz. It can be seen from this graph that this characteristic differs from that of the measured focusing frequency characteristic in that there is a main resonance in the region of 30 Hz, but once this resonance is passed, the amplitude decreases more-or-less exponentially as the driving frequency increases.

The characteristics shown in FIGS. 6 and 7 are sufficient for the operating characteristics of the optical head of an optical information recording and reproduction device.

I claim:

1. A driving device for an objective lens, wherein an optical head, which comprises a built-in laser light source and said objective lens, is positioned with respect to an information, track on an optical information recording medium, and information is recorded thereon and reproduced therefrom by focusing and irradiating a beam of light thereon, said driving device comprising:

a loose linkage mechanism which comprises a cylindrical member and a cylindrical hole portion into which said cylindrical member is inserted so as to face said cylindrical hole portion with an air gap therebetween so that said cylindrical member moves independently from said cylindrical hole portion in the axial direction thereof;

a lens support member which is separate from said cylindrical hole portion and which supports said cylindrical member and which supports said objective lens within said cylindrical member;

an arm member which is constructed of a low-elasticity material and which supports said cylindrical hole portion at an end portion thereof so as to be able to vibrate said cylindrical hole portion in a tracking direction which is perpendicular to the axial direction of said cylindrical hole portion;

a tracking coil which is mounted on said arm member and which vibrates said arm member in said tracking direction in order to make said objective lens follow said information track;

a tracking magnet which is separate from both said lens support member and said arm member and which generates a magnetic field in said tracking coil;

a focusing coil which is mounted on said lens support member and which moves said cylindrical member in the axial direction thereof in order to bring said objective lens to a focus; and a focusing magnet which is separate from both said lens support members and said arm member and which generates a magnetic field in said focusing coil.

2. A driving device for an objective lens of claim 1, wherein said arm member is made of a resin.

3. A driving device for an objective lens according to claim 1, wherein said focusing coil is mounted on said lens support member so that the axis of said focusing coil coincides with the axis of said cylindrical member.

4. A driving device for an objective lens according to claim 1, wherein said focusing coil comprises a plurality of coils mounted on said lens support member so that the center of gravity of said lens support member with said coils mounted thereon is positioned along the axis of said cylindrical member.

5. A driving device for an objective lens according to claim 1, wherein the axial direction of said tracking coil is parallel to said tracking direction.

6. A driving device for an objective lens according to claim 1, wherein said tracking coil comprises a plurality of coils mounted on said arm member and wherein the axial directions of said coils are perpendicular to said tracking direction.

* * * * *